United States Patent [19]
Durand et al.

[11] Patent Number: 5,884,722
[45] Date of Patent: Mar. 23, 1999

[54] ENGINE CRADLE FOR VEHICLE BODY AND FRAME ASSEMBLY AND METHOD OF MANUFACTURING SAME

[75] Inventors: Robert D. Durand, Wyomissing; Richard A. Marando, Bernville; George M. Hetrick, III, Sinking Spring; Stephen M. Lapic, Shillington, all of Pa.

[73] Assignee: Dana Corporation, Toledo, Ohio

[21] Appl. No.: 787,973

[22] Filed: Jan. 23, 1997

[51] Int. Cl.$^6$ ............................................ B60K 5/12
[52] U.S. Cl. ..................... 180/312; 280/781; 29/897.2
[58] Field of Search ..................... 280/781, 796, 280/798, 797, 785, 795; 180/311, 312, 291, 299; 29/897.2, 897.3, 897.312, 897.35; 296/29, 204, 205

[56] References Cited

U.S. PATENT DOCUMENTS

| | | |
|---|---|---|
| 1,992,710 | 2/1935 | Matthaei . |
| 3,176,786 | 4/1965 | Seidl . |
| 4,567,743 | 2/1986 | Cudini . |
| 4,744,237 | 5/1988 | Cudini . |
| 4,899,843 | 2/1990 | Takano et al. ......................... 180/312 |
| 5,005,864 | 4/1991 | Chachere . |
| 5,107,693 | 4/1992 | Olszewski et al. . |
| 5,332,281 | 7/1994 | Janotik et al. . |
| 5,339,667 | 8/1994 | Shah et al. . |
| 5,364,128 | 11/1994 | Ide . |
| 5,398,533 | 3/1995 | Shimanovski et al. . |
| 5,454,453 | 10/1995 | Meyer et al. . |

FOREIGN PATENT DOCUMENTS

739101  10/1955  United Kingdom ................... 180/299

*Primary Examiner*—Peter C. English
*Attorney, Agent, or Firm*—MacMillan, Sobanski & Todd, LLC

[57] ABSTRACT

An engine cradle is formed from tubular stock material using mechanical bending and hydroforming techniques. To facilitate connections with the body and frame assembly of the vehicle, hollow end portions of the engine cradle are subjected to an end forming operation. The result of the end forming operation is that the hollow end region of the engine cradle is deformed to have a generally U-shaped cross section having an aperture formed therethrough. The central portion of the U-shaped end region is flat so as to facilitate the connection of the engine cradle to the body and frame assembly of the vehicle. The central portion also has an effective wall thickness which is equal to the sum of the wall thicknesses of the upper and lower walls of the original hollow region. Similarly, the side portions of the U-shaped end region are also flat and have double wall thicknesses. Consequently, the U-shaped end region is quite strong and rigid, allowing it to be connected directly to the body and frame assembly of the vehicle without ancillary support devices, such as rigid spacers. The U-shaped end region also provides desirable lateral and torsional rigidity to the joint between it and the body and frame assembly.

20 Claims, 4 Drawing Sheets

ENGINE CRADLE FOR VEHICLE BODY AND FRAME ASSEMBLY AND METHOD OF MANUFACTURING SAME

BACKGROUND OF THE INVENTION

This invention relates in general to body and frame assemblies for vehicles. More specifically, this invention relates to an improved structure for an engine cradle for use with such a vehicular body and frame assembly.

Virtually all land vehicles in common use, such as automobiles, vans, and trucks, include a body and frame assembly which is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modern vehicles, such as automobiles and minivans.

In both types of body and frame assemblies, it is known to provide a specialized structure for supporting the engine of the vehicle thereon. This engine support structure, which is commonly referred to as an engine cradle, is frequently embodied as a generally U-shaped member having engine mount portions and body mount portions formed thereon. The engine mount portions are provided for facilitating the connection of the engine to the cradle, while the body mount portions are provided for facilitating the connection of the cradle to the body and frame assembly. Usually, bolts or similar fasteners are used to provide the various connections between the engine, the cradle, and the body and frame assembly. Thus, the engine cradle securely supports the engine on the body and frame assembly of the vehicle during use.

In the past, an engine cradle was usually formed by securing a number of individual components into a desired configuration. Typically, these individual components were metallic pieces which were stamped or otherwise shaped as desired, then welded together to form the final engine cradle. Engine cradles having this general structure have been found to be effective, but are relatively time consuming and expensive to manufacture because of the large number of individual components involved. More recently, engine cradles have been formed from a single tubular component using the process of expansion shaping, commonly referred to as hydroforming. Hydroforming is a well known process which uses pressurized fluid to deform a tubular member into a desired shape. To accomplish this, the tubular member is initially disposed between two die sections of a hydroforming apparatus which, when closed together, define a die cavity having a desired final shape. Thereafter, the tubular member is filled with a pressurized fluid, typically a relatively incompressible liquid such as water. The pressure of the fluid is increased to a magnitude where the tubular member is expanded outwardly into conformance with the die cavity. As a result, the tubular member is deformed into the desired final shape. Hydroforming is an advantageous process for forming engine cradles and other structures because it can quickly deform a single component into a desired shape.

As mentioned above, the engine cradle is frequently embodied as a generally U-shaped member having engine mount portions and body mount portions formed thereon. The body mount portions are usually provided at the open ends of the U-shaped engine cradle and have been formed having hollow rectangular cross sectional shapes. Aligned apertures are formed through two opposed sides of each end of the engine cradle to permit the above-mentioned fasteners to extend therethrough to connect the engine cradle to the body and frame assembly of the vehicle.

To insure that these hollow rectangular ends have sufficient strength to securely connect the engine cradle to the body and frame assembly of the vehicle, past practice has been to provide respective rigid spacers within the hollow ends of the engine cradle. The fasteners extend through the apertures and the rigid spacers to connect the engine cradle to the body and frame assembly of the vehicle. The spacers provide desirable strength and rigidity to the hollow ends of the engine cradle, but also add undesirable expense and complexity thereto. Thus, it would be desirable to provide an improved structure for an engine cradle which eliminates the need for these spacers or other supporting components.

SUMMARY OF THE INVENTION

This invention relates to an improved structure for an engine cradle having reinforced ends which are simple and inexpensive to manufacture and which are sufficiently strong to permit them to be directly connected to a vehicular body and frame assembly without the use of rigid spacers or other supporting components. The engine cradle may be formed from tubular stock material using conventional mechanical bending and hydroforming techniques. To facilitate connections with the body and frame assembly of the vehicle, the hollow end portions of the engine cradle are subjected to an end forming operation. The result of the end forming operation is that the hollow end region of the engine cradle is deformned to have a generally U-shaped cross section having an aperture formed therethrough. The central portion of the U-shaped end region is flat so as to facilitate the connection of the engine cradle to the body and frame assembly of the vehicle. The central portion also has an effective wall thickness which is equal to the sum of the wall thicknesses of the upper and lower walls of the original hollow region. Similarly, the side portions of the U-shaped end region are also flat and have double wall thicknesses. Consequently, the U-shaped end region is quite strong and rigid, allowing it to be connected directly to the body and frame assembly of the vehicle without ancillary support devices, such as the rigid spacers described above. The U-shaped end region also provides desirable lateral and torsional rigidity to the joint between it and the body and frame assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
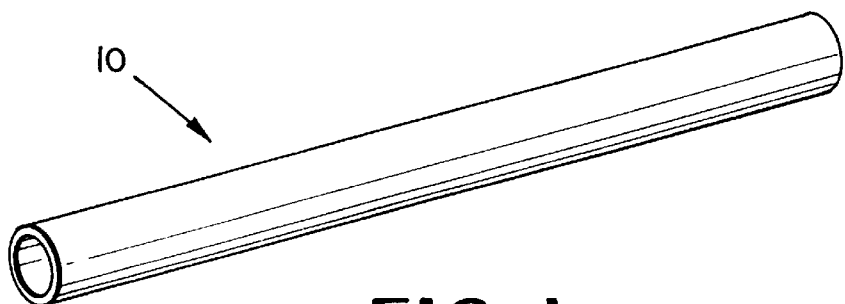
FIG. 1 is a perspective view of a hollow tubular member which can be used to form an engine cradle in accordance with this invention.

Referring now to the drawings, there is illustrated in FIG. 1 a hollow tubular member, indicated generally at 10, which can be used to form an engine cradle in accordance with this invention. Although the illustrated member 10 is tubular in cross sectional shape, it will be appreciated that the member 10 may be formed having other cross sectional shapes if desired. The tubular member 10 is preferably formed from a rigid deformable material, such as metal, having a length and wall thickness which is appropriate for the particular application for the engine cradle to be formed.

Figure 2:
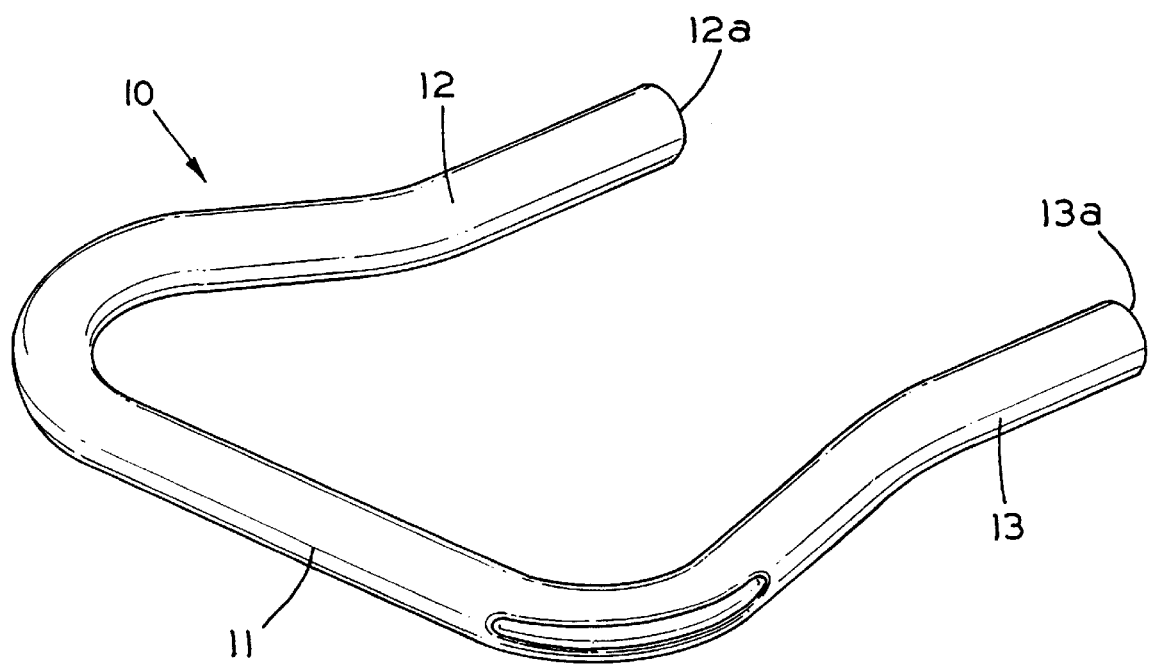
FIG. 2 is a perspective view of the hollow tubular member illustrated in FIG. 1 after having been preliminarily deformed in a tube bending apparatus.

As shown in FIG. 2, the tubular member 10 is initially deformed to have a generally U-shaped configuration defined by a center portion 11 having a pair of leg portions 12 and 13 extending therefrom. The leg portions 12 and 13 terminate in respective hollow cylindrical ends 12a and 13a. The tubular member 10 can be deformed into this U-shaped configuration using a conventional mechanical tube bending apparatus. After this preliminary deformation of the tubular member 10 has been accomplished, the cross sectional shape of the tubular member 10 is still generally circular throughout its entire length. However, certain portions (particularly near the relatively sharp corners between the center portion 11 and the two leg portions 12 and 13) may be folded inwardly to a certain extent as a result of the mechanical bending process.

The deformed tubular member 10 is next subjected to a hydroforming process. As discussed above, hydroforming is a well known process which uses pressurized fluid to deform a tubular member 10 into a desired shape. To accomplish this, the tubular member 10 is initially disposed between two die sections of a hydroforming apparatus which, when closed together, define a die cavity having a desired final shape. Although the die cavity is usually somewhat larger than the tubular member 10 itself and non-circular in cross sectional shape, the closure of the two die sections may, in some instances, cause some mechanical deformation of the tubular member 10. Thereafter, the tubular member 10 is filled with a pressurized fluid, typically a relatively incompressible liquid such as water. The pressure of the fluid is increased to a magnitude where the tubular member 10 is expanded outwardly into conformance with the die cavity.

Figure 3:
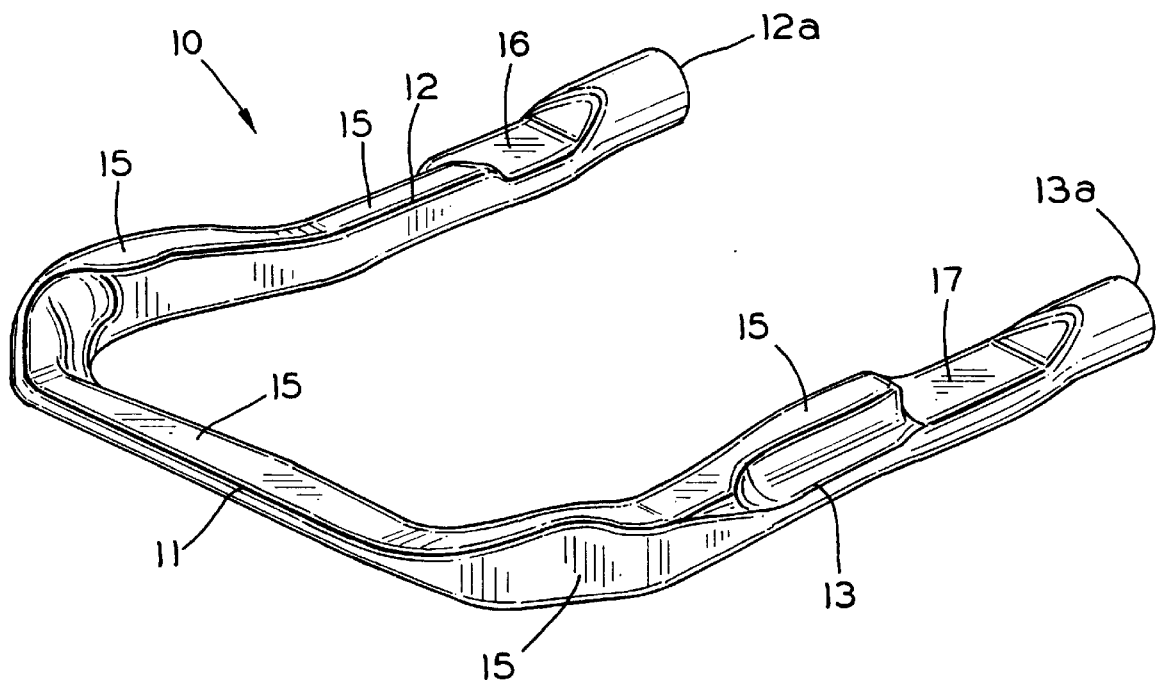
FIG. 3 is a perspective view of the hollow tubular member illustrated in FIG. 2 after having been hydroformed.
Figure 4:
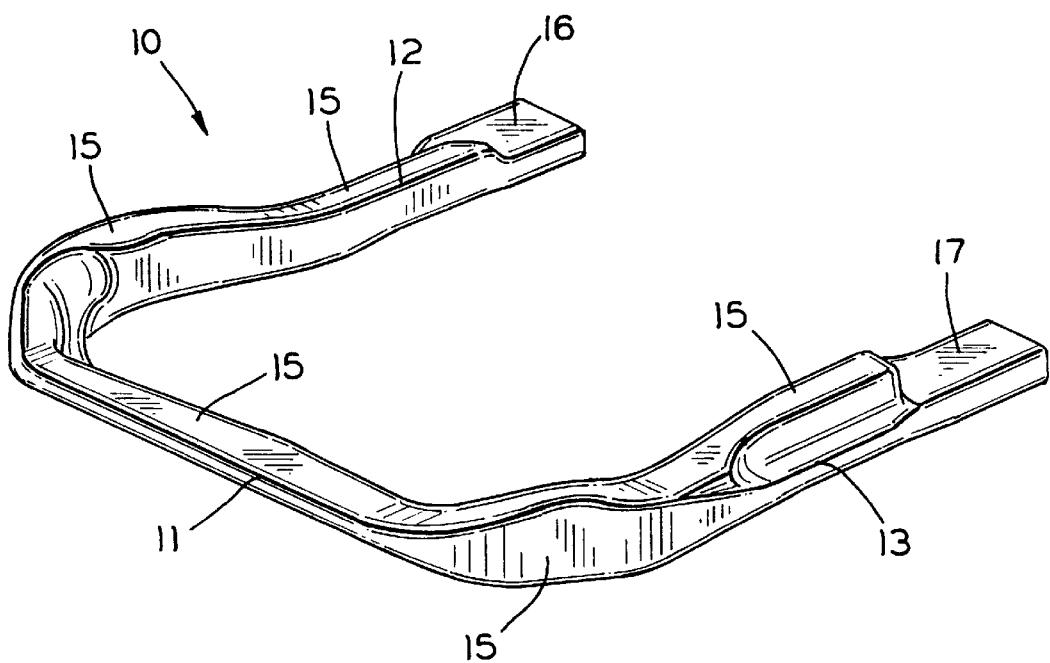
FIG. 4 is a perspective view of the hollow tubular member illustrated in FIG. 3 after the tubular ends have been removed to form the engine cradle.

As a result of this hydroforming process, the tubular member 10 is deformed into the desired final shape illustrated in FIG. 3. As shown therein, the hydroformed tubular member 10 has a number of flat regions 15 formed thereon during the hydroforming process to facilitate the attachment of various brackets (not shown) thereto. These brackets are used to secure the engine and other components of the vehicle to the hydroformed tubular member 10. The hydroformed tubular member 10 further has hollow rectangular regions 16 and 17, respectively, formed during the hydroforming process in the leg portions 12 and 13 adjacent to the ends 12a and 13a thereof. In a typical hydroforming apparatus, however, the ends 12a and 13a of the tubular member 10 extend outwardly from the die sections during the hydroforming process to facilitate the connection of sealing heads (not shown) thereto. The sealing heads are provided to seal the interior of the tubular member 10 to permit it to be filled with a pressurized fluid. One or both of the sealing heads is connected to a source of pressurized fluid for filig the tubular member 10 with fluid and pressurizing such fluid to expand the portion of the tubular member 10 contained between the die sections outwardly into conformance with the die cavity. As a result, the ends 12a and 13a of the legs 12 and 13, respectively, of the tubular member 10 which extend outwardly from the die sections are not deformed during the hydroforming process and, therefore, are maintained in their original hollow cylindrical shape. Following the hydroformiing process, these tubular ends 12a and 13a are cut off or otherwise removed such that the legs 12 and 13 of the tubular member 10 terminate in the hollow rectangular regions 16 and 17, respectively, as shown in FIG. 4. In this manner, the hollow tubular member 10 is formed into an engine cradle.

Figure 5:
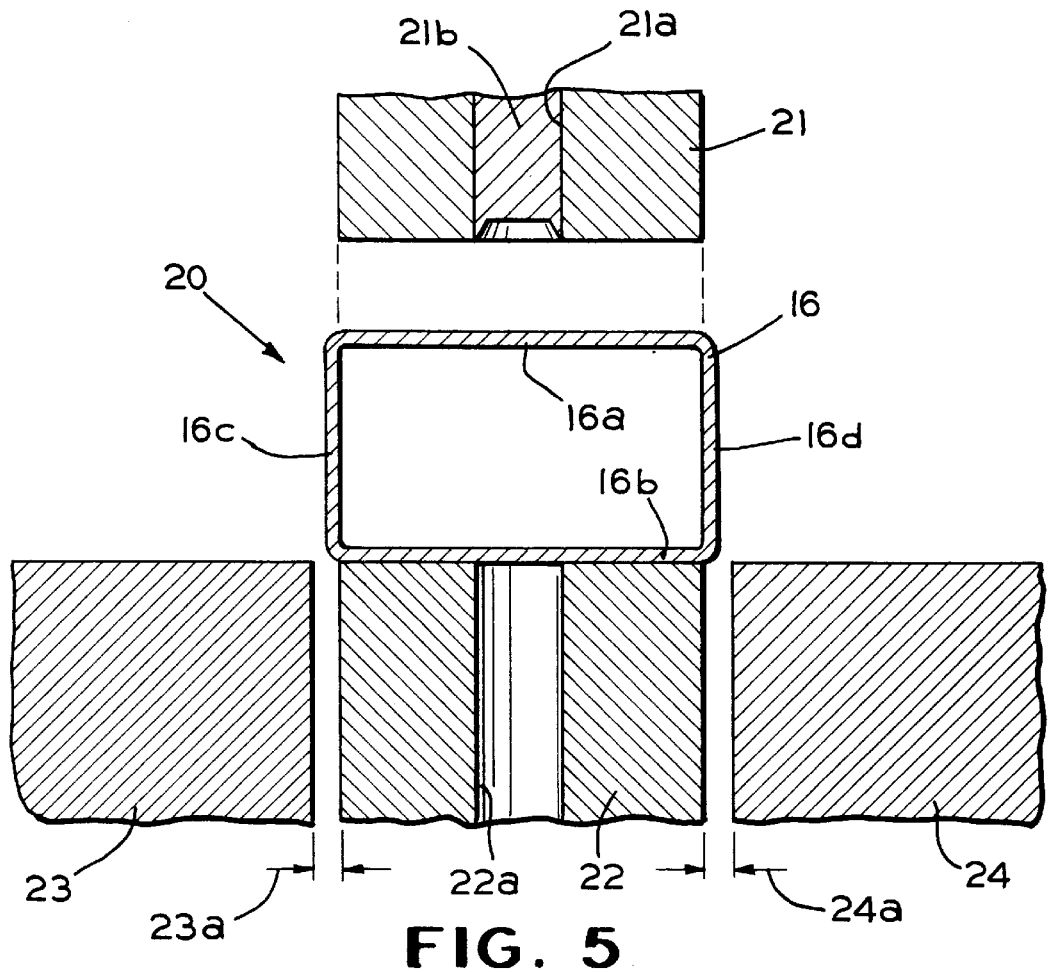
FIG. 5 is a sectional elevational view of one of the hollow rectangular regions of the engine cradle illustrated in FIG. 4 shown disposed within a portion of a schematically illustrated machine for performing an end forming operation thereon.

The structure of one of the hollow rectangular regions 16 is illustrated in detail in FIG. 5. As shown therein, the hollow rectangular region 16 has opposed upper and lower walls 16a and 16b and opposed left and right side walls 16c and 16d. The structure of the other hollow rectangular region 17 is identical, although such is not necessary. As discussed above, the hollow rectangular regions 16 and 17 have been previously used as body mount portions for facilitating the connection of the cradle to a body and frame assembly (not shown) of the vehicle. In the past, aligned apertures were formed through the opposed upper and lower walls 16a and 16b of the hollow rectangular region, and a rigid hollow spacer was disposed therebetween. A fastener extended through the aligned apertures and the rigid hollow spacer to secure the rectangular region 16 to the body and frame assembly of the vehicle.

To eliminate the need for the hollow rigid spacers, the hollow rectangular region 16 of the engine cradle 10 is disposed within an end forming machine, indicated generally at 20 in FIG. 5. The end forming machine 20 includes an upper ram 21 having an opening 21a formed therethrough. A punch 21b is disposed within the opening 21a for reciprocating movement relative to the ram 21. Preferably, the punch 21b is initially retracted within the ram 21 such that the lower cutting edge of the punch 21b is flush with the lower surface of the rarn 21. In the illustrated embodiment, the cutting edge of the punch 21b is circular in shape, although any desired shape may be used. The upper ram 21 is vertically aligned with a lower bed 22 having an opening 22a formed therethrough. The bed 22 is disposed between a pair of side supports 23 and 24 which, as shown in FIG. 5, are spaced apart from the bed 22 by distances 23a and 24a, respectively. For reasons which will become apparent below, the distances 23a and 24a are preferably approximately equal to twice the wall thickness of the hollow rectangular region 16 of the engine cradle 10.

Figure 6:
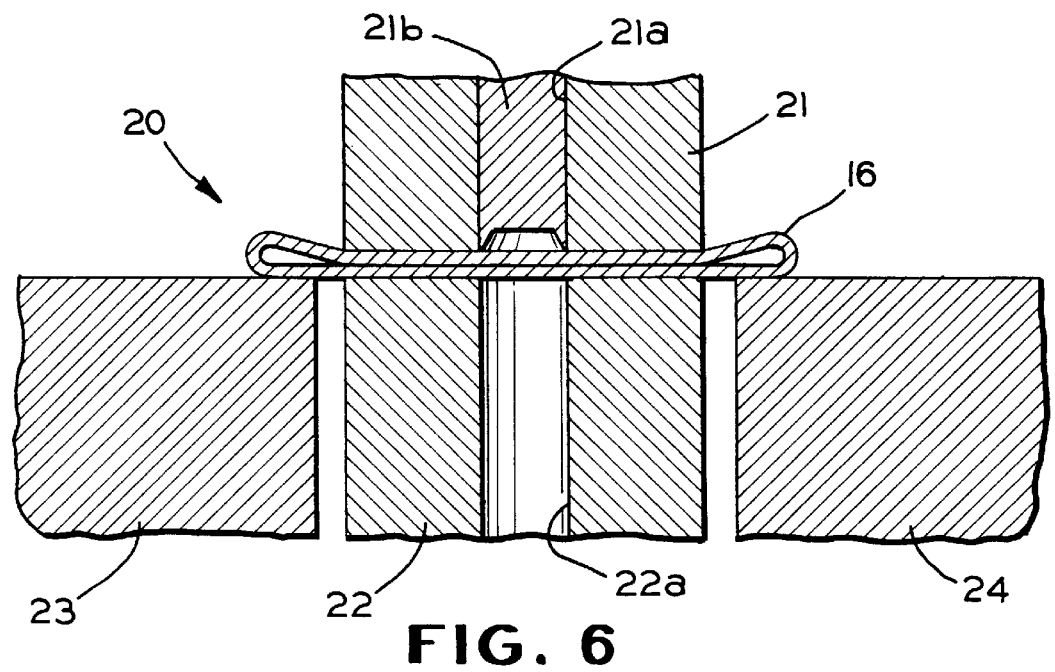
FIGS. 6, 7, and 8 are sectional elevational views similar to FIG. 5 which sequentially illustrate the end forming operation performed on the hollow rectangular region of the engine cradle.

To perform the end forming process, the hollow rectangular region 16 of the engine cradle 10 is initially disposed upon the upper surface of the bed 22 of the end forming machine 20, as shown in FIG. 5. Then, the ram 21 is moved downwardly such that the lower surface thereof engages the upper wall 16a of the hollow rectangular region 16. Further downward movement of the ram 21 causes the hollow rectangular region 16 to be crushed between the lower surface of the ram 21 and the upper surface of the bed 22. When this occurs, the upper wall 16a of the hollow rectangular region 16 is flattened generally adjacent to the lower wall 16b, and the side walls 16c and 16d are folded over, as shown in FIG. 6.

Figure 7:
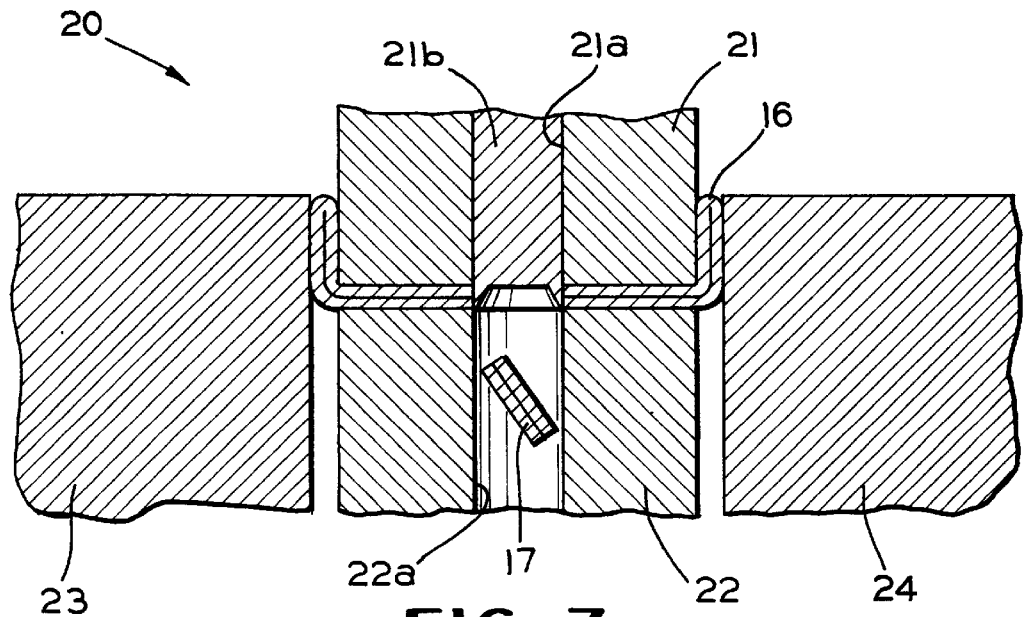

The bed 22 of the end forming machine 20 is preferably supported in a resilient manner relative to the side supports 23 and 24. Thus, the ram 21 can be moved further downwardly within the end forming machine 20. This further downward movement of the ram 21 causes the folded over portions of the side walls 16c and 16d to be moved into the spaces between the bed 22 and the side supports 23 and 24, respectively. As a result, the folded over portions of the side walls 16c and 16d are flattened against one another, as shown in FIG. 7. At the position illustrated in FIG. 7, the bed 22 engages a lower stop (not shown) which prevents further downward movement. When this occurs, the ram 21 ceases its downward movement. However, the punch 21b continues to move downwardly relative to the ram 21 and the bed 22 such that the lower cutting edge thereof cuts through the overlapped upper and lower walls 16a and 16b of the hollow rectangular region 16. As a result, a circular slug 17 of material is cut out of the overlapped upper and lower walls 16a and 16b of the hollow rectangular region 16. The slug 17 is discharged from the end forming machine through the opening 22a formed through the bed 22.

Figure 8:
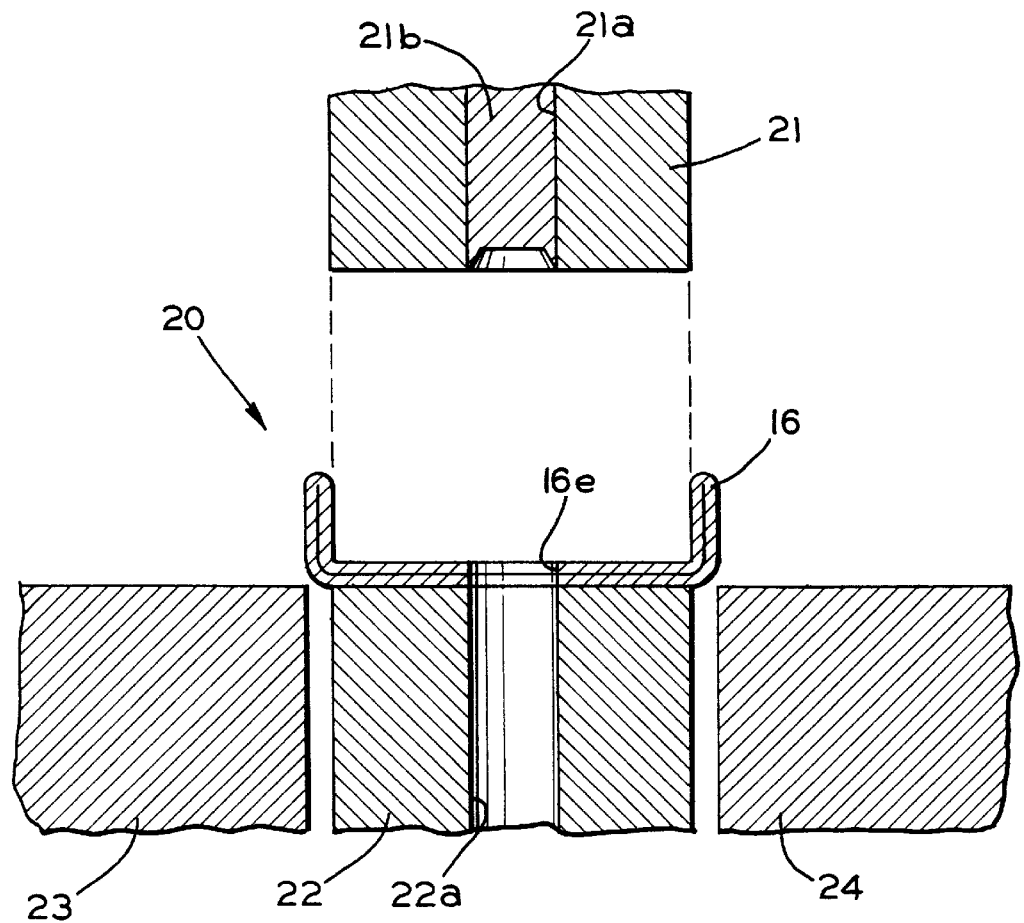

To complete the end forming operation, the punch 21b is retracted within the ram 21, the ram 21 is retracted upwardly from the bed 22, and the bed 22 is returned upwardly to its original position, as shown in FIG. 8. The result of the end forming operation is that the hollow rectangular region 16 of the engine cradle 10 is deformed to have a generally U-shaped cross section including a central web portion having an aperture 16e formed therethrough and a pair of perpendicularly extending side web portions. The aperture 16e permits a fastener, such as a bolt, to extend therethrough to secure the central web portion of the U-shaped region 16 of the engine cradle 10 to a portion of the body and frame assembly of the vehicle. The central web portion of the U-shaped end region 16 is flat, which facilitates the connection of the engine cradle 10 to the body and frame assembly of the vehicle in this manner. However, it will be appreciated that the central web portion of the U-shaped end region may be formed having structures other than the aperture 16e to facilitate the connection of the engine cradle 10 to the body and frame assembly of the vehicle.

The central web portion of the U-shaped end region 16 also has an effective wall thickness which is equal to the sum of the wall thicknesses of the upper and lower walls 16a and 16b of the original hollow rectangular region 16. Similarly, the side web portions of the U-shaped end region 16 are also flat and have double wall thicknesses. Consequently, the U-shaped end region 16 is quite strong and rigid, allowing it to be connected directly to the body and frame assembly of the vehicle without ancillary support devices, such as the rigid spacers described above. The U-shaped end region 16 also provides desirable lateral and torsional rigidity to the joint between it and the body and frame assembly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An engine cradle adapted to be connected to a vehicular body and frame assembly comprising:
    a generally U-shaped hollow member having a predetermined wall thickness and including a central portion having a pair of legs extending generally perpendicularly therefrom, each of said legs terminating in an end region adapted to be connected to the vehicular body and frame assembly, one of said end regions being flattened so as to provide a double wall thickness throughout and to completely close said end region of said member; and
    a structure provided on said double wall thickness end region of said hollow member for facilitating the connection of said end region to the vehicular body and frame assembly.

2. The engine cradle defined in claim 1 wherein both of said end regions are flattened so as to provide double wall thicknesses throughout and to completely close said end regions of said member.

3. The engine cradle defined in claim 2 further including a structure provided on said double wall thickness end regions of said hollow member for facilitating the connection of said end regions to the vehicular body and frame assembly.

4. The engine cradle defined in claim 3 wherein said structure for facilitating the connection of said end regions to the vehicular body and frame assembly includes an aperture formed through each of said central web portions.

5. The engine cradle defined in claim 2 wherein both of said end regions are flattened so as to provide generally U-shaped end regions, each of said generally U-shaped end regions having a central web portion and a pair of side web portions having double wall thicknesses.

6. The engine cradle defined in claim 5 wherein said side web portions extend perpendicularly relative to said central web portion for each of said generally U-shaped end regions.

7. The engine cradle defined in claim 1 wherein said one of said end regions is flattened so as to provide a generally U-shaped end region having a central web portion and a pair of side web portions having double wall thicknesses.

8. The engine cradle defined in claim 7 wherein said side web portions extend perpendicularly relative to said central web portion.

9. The engine cradle defined in claim 7 wherein said structure for facilitating the connection of said end region to the vehicular body and frame assembly includes an aperture formed through said central web portion.

10. The engine cradle defined in claim 1 wherein said structure for facilitating the connection of said end region to the vehicular body and frame assembly includes an aperture formed through said double wall thickness end region of said hollow member.

11. A method of manufacturing an engine cradle adapted to be connected to a vehicular body and frame assembly comprising the steps of:
    (a) providing a generally U-shaped hollow member having a predetermined wall thickness and including a central portion having a pair of legs extending generally perpendicularly therefrom, each of said legs terminating in an end region adapted to be connected to the vehicular body and frame assembly;
    (b) flattening one of the end regions so as to provide a double wall thickness throughout and to completely close the end region of the member; and (c) providing the double wall thickness end region of the hollow member with a structure for facilitating the connection of the end region to the vehicular body and frame assembly.

12. The method of manufacturing an engine cradle defined in claim 11 wherein said step (b) includes flattening each of the end regions so as to provide double wall thicknesses throughout and to completely close the end regions of the member.

13. The method of manufacturing an engine cradle defined in claim 12 including the further step of providing each of the double wall thickness end regions of the hollow member with a structure for facilitating the connection of the end regions to the vehicular body and frame assembly.

14. The method of manufacturing an engine cradle defined in claim 13 wherein said step (c) includes forming an aperture through each of the double thickness end regions to facilitate the connection of the end regions to the vehicular body and frame assembly.

15. The method of manufacturing an engine cradle defined in claim 12 wherein said step (b) is performed by flattening both of the end regions so as to provide generally U-shaped end regions, each of the generally U-shaped end regions having a central web portion and a pair of side web portions having double wall thicknesses.

16. The method of manufacturing an engine cradle defined in claim 15 wherein the side web portions extend perpendicularly relative to the central web portion for each of the generally U-shaped end regions.

17. The method of manufacturing an engine cradle defined in claim 11 wherein said step (b) includes flattening the one of the end regions so as to provide a generally U-shaped end region having a central web portion and a pair of side web portions having double wall thicknesses.

18. The method of manufacturing an engine cradle defined in claim 17 wherein the side web portions extend perpendicularly relative to the central web portion.

19. The method of manufacturing an engine cradle defined in claim 17 wherein said step (c) includes forming an aperture through the central web portion to facilitate the connection of the end region to the vehicular body and frame assembly.

20. The method of manufacturing an engine cradle defined in claim 11 wherein said step (c) includes forming an aperture through the double wall thickness end region to facilitate the connection of the end region to the vehicular body and frame assembly.

* * * * *